April 4, 1967 — J. P. WOODS ET AL — 3,312,978

MAGNETIC STORAGE DRUM

Filed Aug. 29, 1962 — 2 Sheets-Sheet 1

INVENTORS.
John P. Woods.
Henry R. Barta.
Clifford D. Dransfield.
Emmet D. Riggs.
BY Charles F. Steininger
ATTORNEY.

April 4, 1967 J. P. WOODS ET AL 3,312,978

MAGNETIC STORAGE DRUM

Filed Aug. 29, 1962 2 Sheets-Sheet 2

INVENTORS.
John P. Woods.
Henry R. Barta.
Clifford D. Dransfield.
Emmet D. Riggs.
BY Charles F. Steininger
ATTORNEY.

United States Patent Office 3,312,978

Patented Apr. 4, 1967

3,312,978

MAGNETIC STORAGE DRUM

John P. Woods, Henry R. Barta, Clifford D. Dransfield, and Emmet D. Riggs, Dallas, Tex., assignors to The Atlantic Refining Company, Philadelphia, Pa., a corporation of Pennsylvania Filed Aug. 29, 1962, Ser. No. 220,193
16 Claims. (Cl. 346—74)

The present invention relates to an improved recording surface for a magnetic storage drum and the method of placing the surface on the drum. More specifically, the invention relates to an improved permanent recording surface for a delay drum and a method for placing the surface on the drum.

Today it is conventional to place a recording surface on a magnetic storage drum by spraying or otherwise depositing a ferromagnetic coating such as iron oxide on the surface of the drum. Although this practice is in general use today the recording surface produced is not completely satisfactory. The oxide coating is quite fragile and must be treated with extreme care. The drum must be shielded from temperature variations otherwise expansion or contraction will crack or at least injure the coating. Since storage drums and especially delay drums operate continuously and usually at much higher speeds than conventional recording drums it is necessary to separate the magnetic transducers used therewith from the recording surface. This is usually accomplished by using an air cushion. However, even when extreme care is exercised it is quite common for a transducer to accidentally contact the recording surface and gouge or groove the surface so that the transducer must be positioned over a new recording track. This accidental contact can be caused by many and varied conditions such as misadjustment of the transducer, a slight variation in the thickness of the recording surface, a variation in the diameter of the drum, a rise in the drum's operating temperature causing a slight expansion of the drum or the recording surface, etc. After a number of the recording tracks have been grooved so that the drum is unsuited for further operation, the old recording surface must be replaced with a new recording surface. This is a tedious and expensive operation since the old surface must be removed without injuring the drum and a new one placed on the drum in an extremely uniform and precise manner. For these reasons and others not discussed, the presently used iron oxides do not meet all the requirements for a satisfactory storage drum recording surface.

It is therefore an object of the present invention to provide a rugged, inexpensive, permanent magnetic recording surface.

Another object of the present invention is to provide a rugged recording surface for a storage drum that is capable of operating in the field under adverse conditions as well as in a laboratory under controlled conditions.

Another object of the present invention is to provide an improved magnetic drum recording surface in which the magnetic transducers can contact the recording surface without damaging the surface.

Another object of the present invention is to provide an improved method of placing a magnetic recording surface on a storage drum.

Another object of the present invention is to provide a method of placing a metallic recording surface on a magnetic storage drum.

Another object of the present invention is to provide a method of placing a metallic recording surface on a storage drum to prevent the development of spurious signals.

These and other objects and advantages of the present invention will be apparent from the following detailed description when read in conjunction with the accompanying drawings, wherein.

Figures 1, 2:
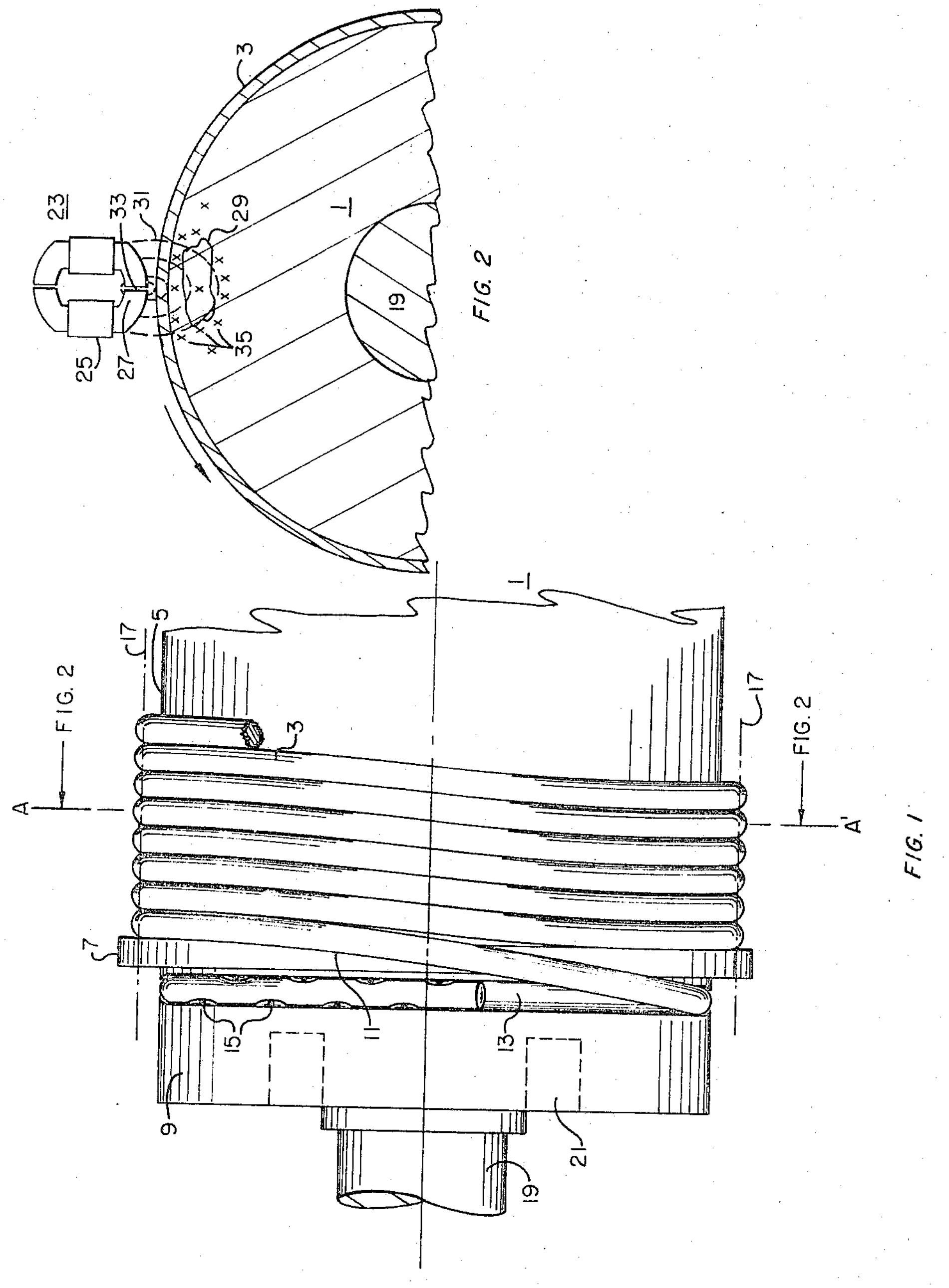
FIGURE 1 illustrates a representative portion of storage drum mounting an improved magnetic recording surface.
FIGURE 2 shows a cross section of the storage drum with a magnetic transducer in operating position.

Briefly described, the invention includes a novel method of placing a continuous length of metallic wire around a cylindrical member so that a plurality of portions of the wire simultaneously act as a rugged permanent magnetic recording surface. The wire is placed on the cylindrical member in a helical, contiguous manner and secured to the drum in a manner to prevent the development of spurious signals during read and write operations. For purposes of the application the term contiguous is used to denote that adjacent turns of wire are in contact with each other at a substantial number of points.

To provide the ideal rugged magnetic recording surface, a metallic wire exhibiting the magnetic qualities of iron oxide and the rugged durable qualities of carbon steel is required. Since applicants are not aware of a metal exhibiting such qualities that is available in wire form, a readily available satisfactory substitute is used.

Applicants have found that spring steel music wire such as produced by Malin and Company, Cleveland, Ohio, is a satisfactory compromise of the qualities discussed above and is readily available in lengths and sizes necessary for producing recording surfaces. The wire is a heat treated carbon steel alloy and exhibits a Rockwell hardness of about C–48. Applicants have found that certain unique problems arise when wire is used to make a magnetic recording surface. These unique problems arise or at least become significant because the wire produces a thicker recording surface than iron oxide and a conventional iron oxide coating and because the suitable available wire is magnetically harder than iron oxide. To produce a rugged recording surface, it is necessary to use a wire diameter large enough to facilitate winding and to withstand transducer contact that would groove a conventional iron oxide recording surface. Wire diameters between approximately 0.005 and 0.020 inch have proven most successful. Because of this increased recording surface thickness and the increased magnetic hardness, a larger recording voltage and transducer gap (gap between the poles of the transducer) for a given drum speed are required to magnetize the recording surface than are required for a conventional iron oxide recording surface. It has been found that this increased recording voltage and transducer gap greatly increases the flux field and the electrical currents induced in the drum. These induced currents react with volumetric resistance changes in the drum to induce spurious signals that seriously interfere with the operation of the storage drum. Applicants have unexpectedly found the volumetric resistance changes can be caused by such things as the application of heat or pressure which sets up a stress at a particular point in the drum, imperfections in casting, grooves, dents, and even cavities plugged with a material identical to the drum. Of course, an imperfection in the surface of the material around which the wire is wound usually produces a larger spurious signal than a change in volumetric resistance. This is because the imperfection will change the thickness of the magnetic recording surface at that point. It is therefore necessary to insure that the material used to make the storage drum does not contain surface imperfections and volumetric resistance changes that are located within the portion of the drum influenced by the flux fields and currents induced therefrom. As will be detailed hereinafter, it is necessary to grind the portion of the drum supporting the wound wire and to fix the wire to the drum in a particular manner to prevent producing volumetric resistance changes that would produce spurious signals.

Considering the improved recording surface in more detail, refer now to FIGURE 1 showing a portion of storage drum 1 which includes wire 3 wound in a helical, contiguous fashion around channel 5. Shoulder 7 is positioned between channel 5 and surface 9. For purposes of simplicity only a portion of the storage drum is shown. The right-hand portion of the drum, not shown, can be similar to the disclosed portion and the drum's over-all length can be varied as desired. Shoulders 7 are an integral part of the drum and project upwardly in a manner to retain wire 3 in a fixed position in channel 5. Groove 11 is cut in shoulder 7 so that wire 3 can pass through the shoulder and into groove 13. As shown, groove 11 spirals through shoulder 7. Preferably, groove 11 will be a one-turn spiral groove through shoulder 7. Portions of groove 13 are peened at points 15 so as to fix the end of wire 3 to surface 9 without producing spurious signals. The diameter of 13 is made slightly smaller than 5 so that peens 15 are not ground off when the surface of wire 3 is ground to level 17. Drum 1 is fixed to and rotates with shaft 19. Optional cavities 21 are placed in 1 to dynamically balance the finished recording drum. Lines 17 indicate the approximate level to which wire 3 is ground to produce a flat recording surface that is substantially parallel to the surface of channel 5.

FIGURE 2 is a cross section of FIGURE 1 at line AA'. Magnetic transducer, represented schematically as 23, is not shown in FIGURE 1 for purposes of simplicity. However, it should be noted that if the transducer were shown in FIGURE 1 the width of each pole piece 27 would extend across a plurality of wire revolutions. Transducer 23 includes windings 25 and pole pieces 27 and is used to illustrate how volumetric resistance anomaly 29 produces a spurious signal when metallic recording surface made of wire 3 is used. When current is passed through coils 25, magnetic flux paths 31 extend from poles 27 as shown and magnetize portions of 3 in a conventional manner. However, since the metallic recording surface made of wire 3 is thicker and magnetically harder than a conventional iron oxide recording surface, for reasons discussed heretofore, a wider transducer gap 33 and recording voltage is required to magnetize the portions of 3 under pole pieces 27. The particular transducer gap and recording voltage are determined in a conventional manner well known to those skilled in the art. This wider transducer gap and larger recording voltage generate an intense flux field that penetrates deeper into recording drum 1 than a conventional recording operation would penetrate. The electrical current, represented by X marks 35, is induced in drum 1 by flux 31 according to basic electrical law. The direction of this induced current flow is determined by the right-hand rule. When volumetric resistance anomaly 29 exists in drum 1 within the influence of current 35, a change of electrical resistance is manifested in the path of the current. Therefore, when electrical current 35 flows through drum 1 and encounters anomaly 29, a change in current flow is manifested. This change in electrical current flow induces a counter E.M.F. voltage that appears as spurious signal during read or write operations. Since most storage systems also utilize erase heads or magnets which develop extremely strong flux fields, the spurious signals produced by 29 reacting with current induced by these flux fields are even more serious than the spurious signals produced by the read-write operations.

The following procedure for placing the improved metallic magnetic recording surface on a storage drum has proven economical and successful.

A cylindrical member of desired diameter and length is selected. The member may be any nonmagnetic material strong enough to retain its shape under the pressure exerted by the wound wire. For ease of machining any good grade of heat treated nonmagnetic alloy is desired; however, to date aluminum 70–75T6 has proven most desirable. The material may be in the form of a solid bar stock or may be a cylindrical tube containing walls of a desired thickness. The cylindrical member which will be made into drum 1, FIGURE 1, is placed on an engine lathe such as 37, FIGURE 3. A portion of the outside circumference of the member is machined to produce channel 5 bounded by shoulders 7, FIGURE 1. If more than one recording surface is desired on a particular member, more than one channel 5 is machined on the cylindrical element. The machining operation can be accomplished by lathe 37 using a suitable tool bit positioned in lathe carriage 39, FIGURE 1, in a conventional manner. After the channel has been machined, surfaces 9 are machined in the same manner to a slightly smaller diameter than channel 5 for reasons discussed heretofore. Next, lathe carriage 39 and its appropriate cutting element are set to machine a one turn spiral groove through each shoulder 7 and onto each surface 9 to produce grooves 11 and 13 as shown in FIGURE 1. If desired, groove 11 may be cut in each shoulder 7 by a conventional jeweler's saw.

Prior to the wire winding operation, a spool 41 of spring steel music wire of the desired diameter is positioned on an idler system not shown. Drum 1 is placed in engine lathe 37, FIGURE 3, and a wire guide device 43 is positioned in lathe carriage 39. Wire 3 is threaded through the aperture in 43 around groove 13, FIGURE 1, through groove 11 and onto channel 5. Portions of groove 13 are peened over the end of wire 1 as shown at points 15 in a manner to secure wire 3 to drum 1. It is desirable that a coat of water resistant metal-to-metal binder, such as Armstrong No. A1 Epoxy appropriately mixed with Armstrong solvent E, be placed in the grooves and in the channel before the wire is positioned in same. The epoxy serves to hold the wire in place and prevents twisting, during and after the grinding operation. Wire 3 is placed immediately adjacent shoulder 7, and engine lathe 37 is set in a conventional manner so that drum 1 and carriage 39 automatically move in the indicated directions to wind wire 3 in a helical, contiguous manner around channel 5 as shown in FIGURE 1. The operation must be performed without kinking or otherwise stressing the wire beyond its elastic limit, otherwise a spurious signal will be produced at the point of stress. In applicants' typical 5-inch diameter delay drum, approximately 117 turns (155 feet) of 0.016 inch diameter musical wire is wound in a recording channel extending approximately 1.875 inches longitudinally along the surface of the drum. The channel is bound by two shoulders, each shoulder approximately 0.062 inch wide. The music wire is wound so that a tension of approximately 10 to 20 pounds is continuously applied to the wire between 43 and the drum. This pressure is sufficient to assure that each turn of wire is placed firmly in contact with the succeeding turn. The end of the wire is terminated on the right-hand side of the channel 5, FIGURE 1, not shown, in the same manner as the starting end of the wire is terminated in FIGURE 1. The small peens 15 located in surface 9 are removed from the currents 25, FIGURE 2, and secure wire 3 to 9 without producing spurious signals.

Figures 3, 4:
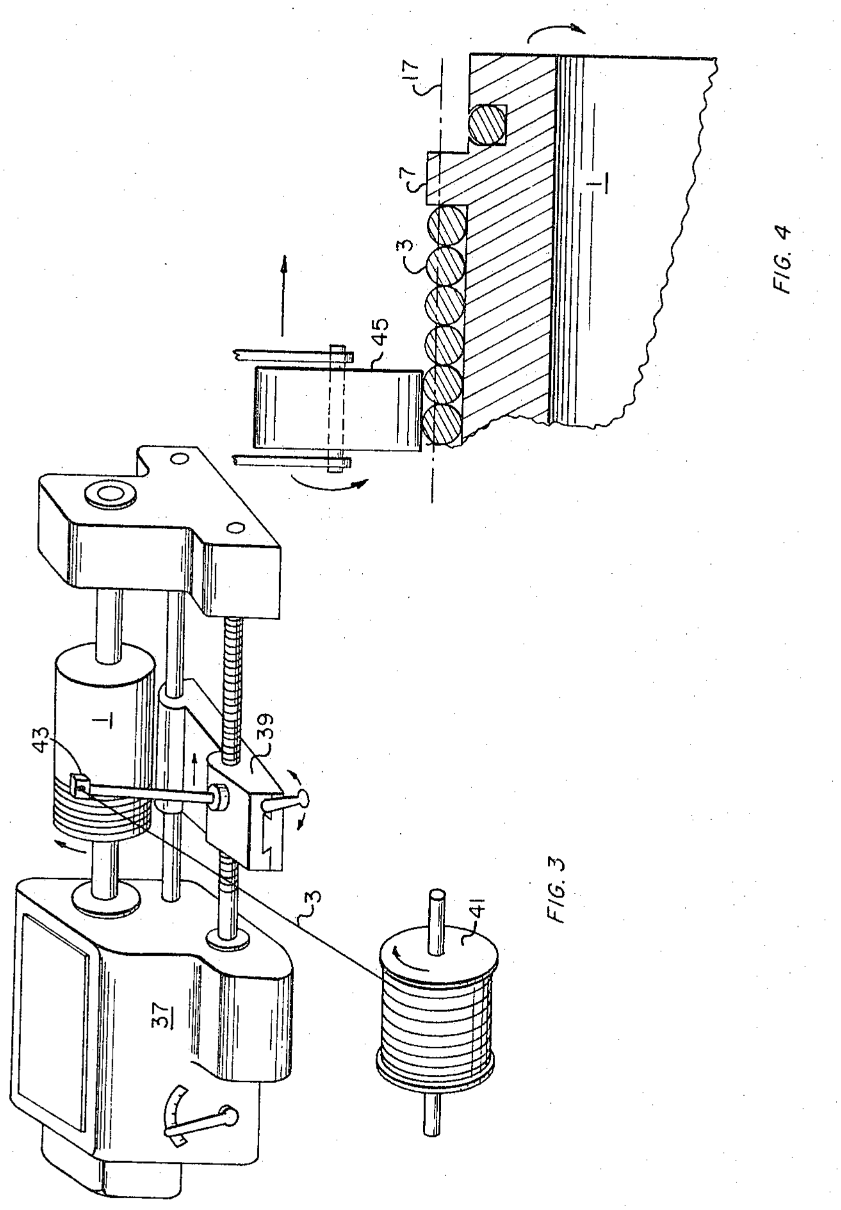
FIGURE 3 illustrates how wire is placed on the storage drum to form the recording surface.
FIGURE 4 illustrates how the wire surface may be ground.

After the wire is secured at both ends and the epoxy has cured, if used, the wire is ready for grinding. FIGURE 4 illustrates, in schematic form, a conventional cylindrical hydraulically operated grinder operating on a portion of the wire winding. Drum 1 is positioned in a machine such as engine lathe 37, FIGURE 3, that is capable of rotating drum 1 at a desired speed. The machine is set to revolve 1 at a slow speed in the direction indicated in FIGURE 4. Grinding element 45 rotates in the opposite direction and is moved across wire 3 as shown. Line 19 indicates the approximate depth to which the wire 3 and shoulders 7 are ground. The exact depth of grinding is not critical and depends mainly upon the diameter of wire 3. Of course, it is desirable to grind the wire to a depth which most closely produces a continuous recording surface, i.e., little or no gap between the turns of the wire. In any event, it is not desirable to grind the wire in excess of one-half of the wire diameter since adjacent turns of wire will no longer be in contact with each other.

After the grinding operation, it is desirable to coat the surface of wire 3 with a suitable rust preventative such as Dow Corning 4 Compound produced by the Dow Corning Co. of Midland, Michigan. After the grinding operation, it is usually necessary to dynamically balance the drum so that magnetic transducers operating with the drum can be set an accurate distance from the recording surface. The dynamic balancing operation can be done in a conventional manner; however, cavities such as 21, FIGURE 1, should be drilled in areas of the drum that do not lie within the influence of the induced currents produced by the read-write transducer and the erase magnets. Generally speaking, the holes should be drilled as close to shaft 19 as possible and removed at least one inch longitudinally from the nearest edge of the recording surface.

Although a specific method of constructing the improved magnetic recording surface has been described, it should be understood that various substitutions and modifications can be made without departing from the scope of the invention. For instance, the magnetic recording surface can be produced without forming a channel on the drum. That is, the wire can be wound directly on the surface of the drum and the windings secured by a strong metal cement. However, it should be noted that the use of a channel is desired, especially when the drum rotates at a high velocity. Additionally, the ends of the wire can be fixed to the drum in various ways besides the peened groove means described. It should be remembered, however, that undesirable spurious signals are developed when the ends of the wire are fixed to the drum by pins or other conventional fastening means which set up volumetric resistance anomalies within the influence of the operating transducers and erase magnets. The exact diameter and type wire is not important as long as the diameter is large enough to afford the proper strength without undue thickness and the material exhibits the necessary magnetic characteristics for recording purposes. For the most efficient operation of a system using the improved magnetic recording surface, the read and write transducers should be constructed in the manner described in copending application Ser. No. 220,242, filed Aug. 29, 1962, owned by a common assignee. Therefore, in view of the modifications that are obvious to one skilled in the art in light of this disclosure, the scope of the present invention is limited only by the appended claims.

We claim:

1. An improved magnetic recording drum comprising
(a) a cylindrical member,
(b) a first channel bounded by first and second shoulders, said first channel positioned around the outside of an inner portion of said cylindrical member and having a bottom diameter smaller than the diameter of said shoulders,
(c) a spiralling slot in each of said shoulders, said slots extending from said first channel and spiralling toward the end of said cylindrical member,
(d) a continuous length of magnetic wire of uniform volumetric resistance in a helical contiguous relationship around said bottom of said first channel with each end of said wire placed in the slot in one of said shoulders, and
(e) the outer surfaces of said windings of wire forming a smooth cylindrical recording surface parallel to said bottom of said first channel.

2. The improved magnetic recording drum of claim 1 wherein the bottom of the first channel and the bottom surfaces of the windings of wire touching said bottom of said first channel are covered with an adhesive, and at least part of the void spaces between contiguous spirals of wire opposite said first channel is filled with said adhesive.

3. The improved magnetic recording drum of claim 1 wherein the volumetric resistance of said wire and the part of said cylindrical member between the shoulders is sufficiently uniform to prevent production of spurious signals when said part of the magnetic recording drum between said shoulders is rotated past the field of a transducer which field is sufficient to record reproducible magnetic information in said wire.

4. The improved magnetic recording drum of claim 1 wherein the shoulders are of approximately the same height as the smooth outer wire surface.

5. The improved magnetic recording drum of claim 1 wherein there are two second channels around the outside surface of the cylindrical member, said second channels having a diameter smaller than the diameter of the shoulders and being spaced from the ends of said first channel by said shoulders, a groove around the bottom of each of said second channels and each end of the wire is placed in said grooves and the edges of said grooves are peened over said wire to hold said wire in said grooves.

6. The improved magnetic recording drum of claim 5 wherein the volumetric resistance of said wire and the part of said cylindrical member between the shoulders is sufficiently uniform to prevent production of spurious signals when said part of the magnetic recording drum between said shoulders is rotated past the field of a transducer which field is sufficient to record reproducible magnetic information in said wire.

7. A method of producing an improved permanent recording surface for a magnetic drum comprising the steps of
(a) forming a channel around an inner portion of the outside surface of the drum, said channel bound on each side by a shoulder,
(b) winding a continuous length of magnetic wire in a helical, contiguous relationship around said channel and fixing the ends of said wire to the portions of said drum outside of said channel.

8. In a method as set forth in claim 7 wherein each end of the wire is anchored in a second channel.

9. A method of producing an improved magnetic recording drum comprising the steps of
(a) winding a continuous length of magnetic wire in a helical, contiguous relationship around the circumference of at least a portion of a cylindrical drum, and
(b) maintaining the volumetric resistance of said wire and said cylindrical drum sufficiently uniform to prevent production of spurious signals when the portion of said wire and said cylindrical drum influenced by currents produced during transducer operation is rotated past said transducer.

10. In a method as set forth in claim 9 wherein at least a portion of the top surface of the wire is ground producing a smooth recording surface parallel to the circumference of the cylindrical drum.

11. A method of producing an improved magnetic recording drum comprising the steps of
(a) forming a first channel around an inner portion of the outside surface of a cylindrical drum, the bottom of said first channel exhibiting a smaller diameter than the parts of said cylindrical drum at each end of said first channel thereby forming a shoulder adjacent each end of said first channel, (b) forming a spiralling slot in each shoulder, each of said slots extending from said first channel and spiralling toward the end of said cylindrical drum, (c) winding a continuous length of magnetic wire of uniform volumetric resistance in a helical contiguous relationship around said bottom of said first channel with each end of said wire placed in the slot in one of said shoulders, and (d) grinding said wire to form a smooth cylindrical surface parallel to said bottom of said first channel,

12. In a method as set forth in claim 11 wherein prior to the wire winding operation a substantial portion of the bottom surface of the first channel is covered with enough adhesive to fill at least part of the void between contiguous spirals of wire when said wire is wound about said first channel of the cylindrical drum.

13. In a method as set forth in claim 11 wherein the volumetric resistance of said wire and the part of said cylindrical drum between said shoulders is maintained sufficiently uniform to prevent production of spurious signals when said part of the magnetic recording drum between said shoulders is rotated past the field of a transducer which field is sufficient to record reproducible magnetic information in said wire.

14. In a method as set forth in claim 11 wherein the shoulders are ground to approximately the same height as the ground wire surface.

15. In a method as set forth in claim 11 wherein prior to the wire winding operation, there are formed two second channels around the outside surface of the cylindrical drum, said second channels exhibiting a smaller diameter than the diameter of the shoulders and being spaced from the ends of said first channel thereby leaving said shoulders between said first and said second channels with the spiralling slots through said shoulders extending to said second channels, and there is formed a groove around the bottom of each of said second channels which groove is large enough to receive said wire; and when said wire is wound about said first channel, each end of said wire is placed in said groove of said second channel and said slot through said shoulders and the edges of said grooves are peened over said wire to hold said wire in place.

16. In a method as set forth in claim 15 wherein the volumetric resistance of said wire and the part of said cylindrical drum between said shoulders is maintained sufficiently uniform to prevent production of spurious signals when said part of the magnetic recording drum between said shoulders is rotated past the field of a transducer which field is sufficient to record reproducible magnetic information in said wire.

References Cited by the Examiner

UNITED STATES PATENTS 2,984,538 5/1961 Kelner et al. --------- 346—74

BERNARD KONICK, *Primary Examiner.*

IRVING L. SRAGOW, *Examiner.*

R. M. JENNINGS, A. I. NEUSTADT, *Assistant Examiners.*